United States Patent
Kulavik et al.

(10) Patent No.: US 9,383,744 B2
(45) Date of Patent: Jul. 5, 2016

(54) PACE-AWARE MUSIC PLAYER

(71) Applicant: Voyetra Turtle Beach, Inc., Valhalla, NY (US)

(72) Inventors: Richard Kulavik, San Jose, CA (US); Christopher Church, San Jose, CA (US)

(73) Assignee: Voyetra Turtle Beach, Inc., Valhalla, NY (US)

( * ) Notice: Subject to any disclaimer, the term of this patent is extended or adjusted under 35 U.S.C. 154(b) by 0 days.

(21) Appl. No.: 14/519,909

(22) Filed: Oct. 21, 2014

(65) Prior Publication Data

US 2016/0109880 A1   Apr. 21, 2016

(51) Int. Cl.
*G06F 17/00*    (2006.01)
*G05B 19/42*    (2006.01)
*A63B 71/06*    (2006.01)

(52) U.S. Cl.
CPC ............. *G05B 19/42* (2013.01); *A63B 71/0686* (2013.01); *A63B 2071/0625* (2013.01); *G05B 2219/23249* (2013.01); *G10H 2210/371* (2013.01); *G10H 2220/391* (2013.01); *G10H 2240/131* (2013.01)

(58) Field of Classification Search
CPC ................... A63B 71/0686; A63B 2071/0625; G10H 2220/371; G10H 2240/131; G10H 2210/391
See application file for complete search history.

(56) References Cited

U.S. PATENT DOCUMENTS

2006/0253210 A1* 11/2006 Rosenberg ........... G11B 27/005 700/94
2007/0079691 A1*  4/2007 Turner ..................... G10H 1/40 84/612

* cited by examiner

*Primary Examiner* — Joseph Saunders, Jr.
(74) *Attorney, Agent, or Firm* — McAndrews, Held & Malloy, Ltd.

(57) ABSTRACT

An electronic device may comprise audio processing circuitry, pace tracking circuitry, and positioning circuitry. The pace tracking circuitry may be operable to selects songs to be processed for playback, and/or control time stretching applied to such songs, by the audio processing circuitry based on position data generated by the positioning circuitry. The position data may indicate the pace of a runner during a preceding, determined time interval. The pace tracking circuitry may be operable to control the song selection and/or time stretching based on a runner profile data stored in memory of the music device. The profile data may comprise runner's distance-per-stride data. The electronic device may comprise one or more sensors operable to function as a pedometer. The pace tracking circuitry may be operable to update the distance-per-stride data based on the position data and based on data output by the one or more sensors.

20 Claims, 5 Drawing Sheets

PACE-AWARE MUSIC PLAYER

BACKGROUND

Limitations and disadvantages of conventional music players will become apparent to one of skill in the art, through comparison of such approaches with some aspects of the present method and system set forth in the remainder of this disclosure with reference to the drawings.

BRIEF SUMMARY

Methods and systems are provided for a pace-aware music player, substantially as illustrated by and/or described in connection with at least one of the figures, as set forth more completely in the claims.

DETAILED DESCRIPTION

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. As another example, "x, y, and/or z" means any element of the seven-element set {(x), (y), (z), (x, y), (x, z), (y, z), (x, y, z)}. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled, or not enabled, by some user-configurable setting.

Figure 1:
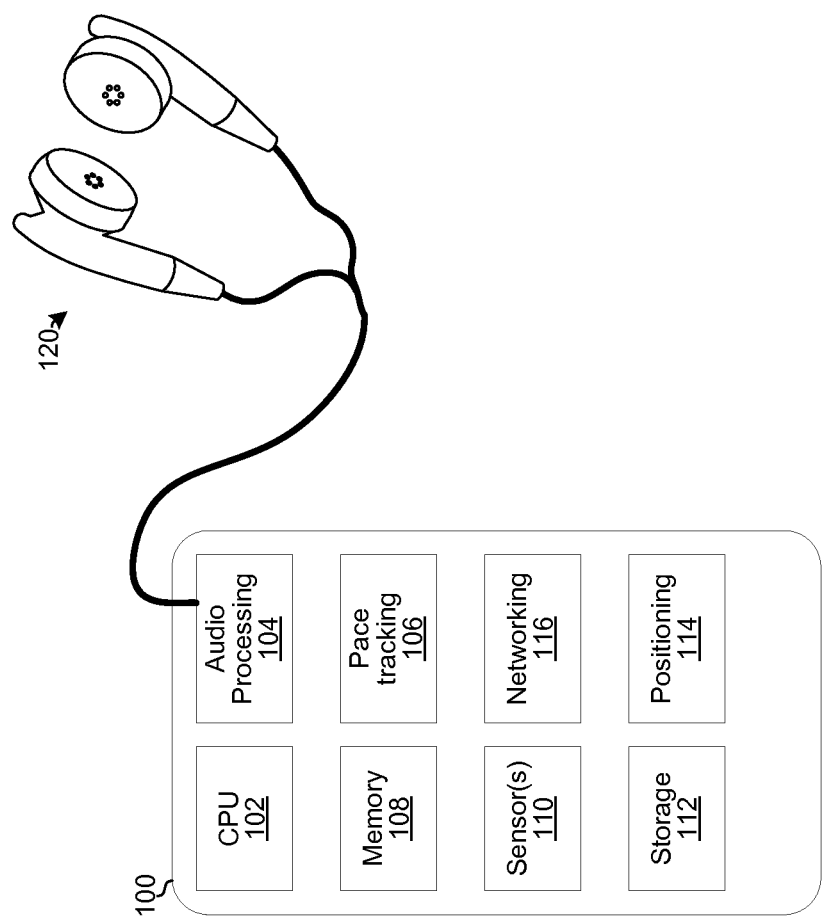
FIG. 1 depicts an example music player implementing aspects of this disclosure.

FIG. 1 depicts an example music player implementing aspects of this disclosure. The example music player 100 comprises a CPU 102, audio processing circuitry 104, memory 108, pace tracking circuitry 106, sensor(s) 110, storage 112, and positioning circuitry 114.

The CPU 102 is operable to execute instructions for controlling/coordinating the overall operation of the music player 100. Such instructions may be stored in storage 112 and loaded into memory 108 during runtime. Such instructions may be part of an operating system of the music player and/or part of one or more software applications installed on the music player.

The storage 112 may comprise, for example, nonvolatile memory such as a hard disk drive or flash. The memory 108 may comprise, for example, DRAM and/or SRAM.

The audio processing circuitry 104 is operable to perform audio processing functions such as decompression, decoding, surround-sound processing, amplification, and/or the like to output single channel or multi-channel (e.g., 2 channels for stereo or 5, 7, or more channels for surround sound) audio signals (e.g., to a headset 120 via a phone plug (not shown)). In an example implementation, functions performed by the audio processing circuitry 104 comprise adjusting the tempo of songs it processes. Adjusting the tempo of a song without affecting the pitch is referred to as time-stretching. An example implementation of audio processing circuitry 104 is described below with reference to FIG. 2.

The pace tracking circuitry 106 is operable to select songs for processing by the audio processing circuitry 104 and/or control time-stretching applied to songs by the audio processing circuitry based on data from one or more of: the positioning circuitry 114, the sensor(s) 110, run profile data stored in storage 112, and/or runner profile data stored in storage 112. An example implementation of audio processing circuitry 104 is described below with reference to FIG. 2.

The sensor(s) 110 may comprise, for example, one or more of each of: a gyroscope, an altimeter, an accelerometer, and/or the like. The sensor(s) 110 may make the data it/they generate available to other components of the music player 100 in analog and/or digital form.

The positioning circuitry 114 is operable to determine a position of the music player 100 relative to one or more reference points. In an example implementation, the positioning circuitry may comprise a global positioning system (GPS) receiver and a Wi-Fi receiver and may determine the position of the music player 100 based on GPS signals and/or signals from Wi-Fi hotspots.

The networking circuitry 116 is operable to transmit and/or receive data via one or more wired and/or wireless interface(s) (e.g., Cellular, Wi-Fi, Bluetooth, USB, and/or the like).

Figure 2:
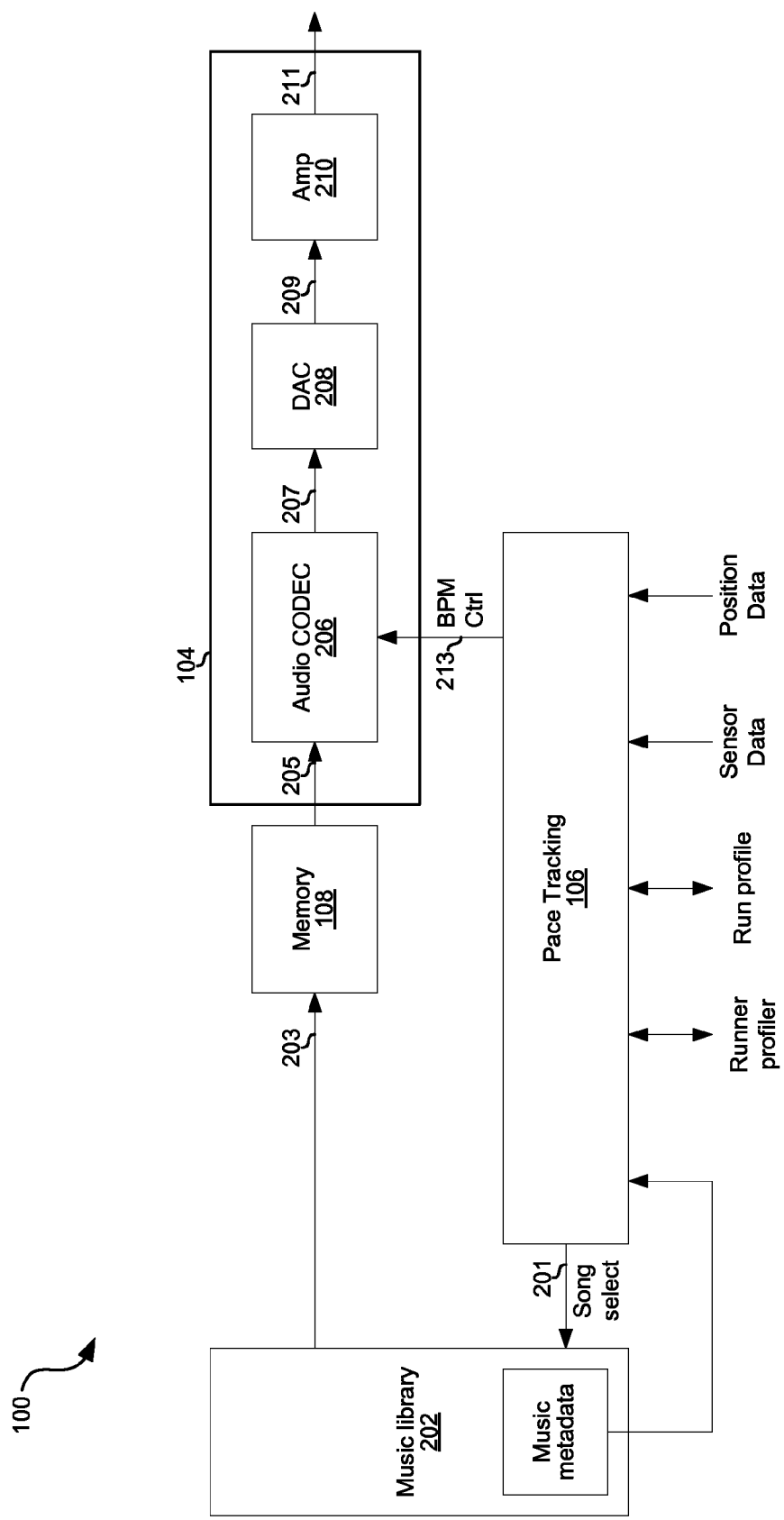
FIG. 2 depicts additional details of an example implementation of the music player of FIG. 1

FIG. 2 depicts additional details of an example implementation of the music player 100 of FIG. 1. Shown are a music library 202, the pace tracking circuitry 106, the memory 108, and the audio processing circuitry 104. The processing circuitry 104 comprises audio coder/decoder (CODEC) 206, digital-to-analog converter (DAC) 208, and amplifier 210.

The music library 202 comprises one or more songs (e.g., one or more files in MP3, WAV, or other suitable format). The music library 202 may be local (e.g. in storage 112) and/or cloud-based (e.g., accessed via the networking circuitry 116). Stored with the music files in the music library 202 is metadata which includes information about the tempo (e.g., measured in beats per minute) of the songs in the music library 202.

The memory 108 is operable to buffer song data retrieved from the music library 202. The buffering may be necessary due to differences in the rate at which audio data arrives from the music library and the rate at which the audio data is processed by the audio processing circuitry 104. Management of the buffering is complicated by the dynamic song selection and time stretching performed by the pace tracking circuitry 106. An example process for buffer management to accommodate the operation of the pace tracking circuitry 106 is described below with reference to FIG. 5.

The audio CODEC 206 is operable to convert the song data from the music library 202 into a digital audio stream. This may comprise, for example, decompressing, decoding, equalization, and/or the like. In the example implementation shown, the digital audio stream is conveyed to the DAC 208.

In another example implementation, the digital audio stream may be output external to the music player 100 via, for example, the networking circuitry 116 (e.g., Bluetooth) and/or a wired connection (e.g., USB).

The DAC 208 is operable to convert the digital audio stream to an analog audio signal.

The amplifier 210 is operable to amplify the levels of the analog audio signal to levels suitable for output to one or more speakers (e.g., speakers built into the music player and/or speakers of a headset such as the headset 120) and as indicated by a user-controlled volume setting.

The pace tracking circuitry 106 receives as input run profile data (e.g., from storage 112 and/or memory 108), runner profile data (e.g., from storage 112 and/or memory 108), sensor data from sensor(s) 110, and position data from positioning circuitry 114. The pace tracking circuitry 106 is operable to control time stretching performed by the audio CODEC 206 via the signal 213. The pace tracking circuitry 106 is operable to select songs output from the music library 202 via the signal 201. The pace tracking circuitry 106 may also be operable to update the runner profile and/or run profile data (e.g., in memory 108 and/or storage 112).

Example operation of the circuitry of FIG. 2 is described below with reference to FIG. 3.

Figure 3:
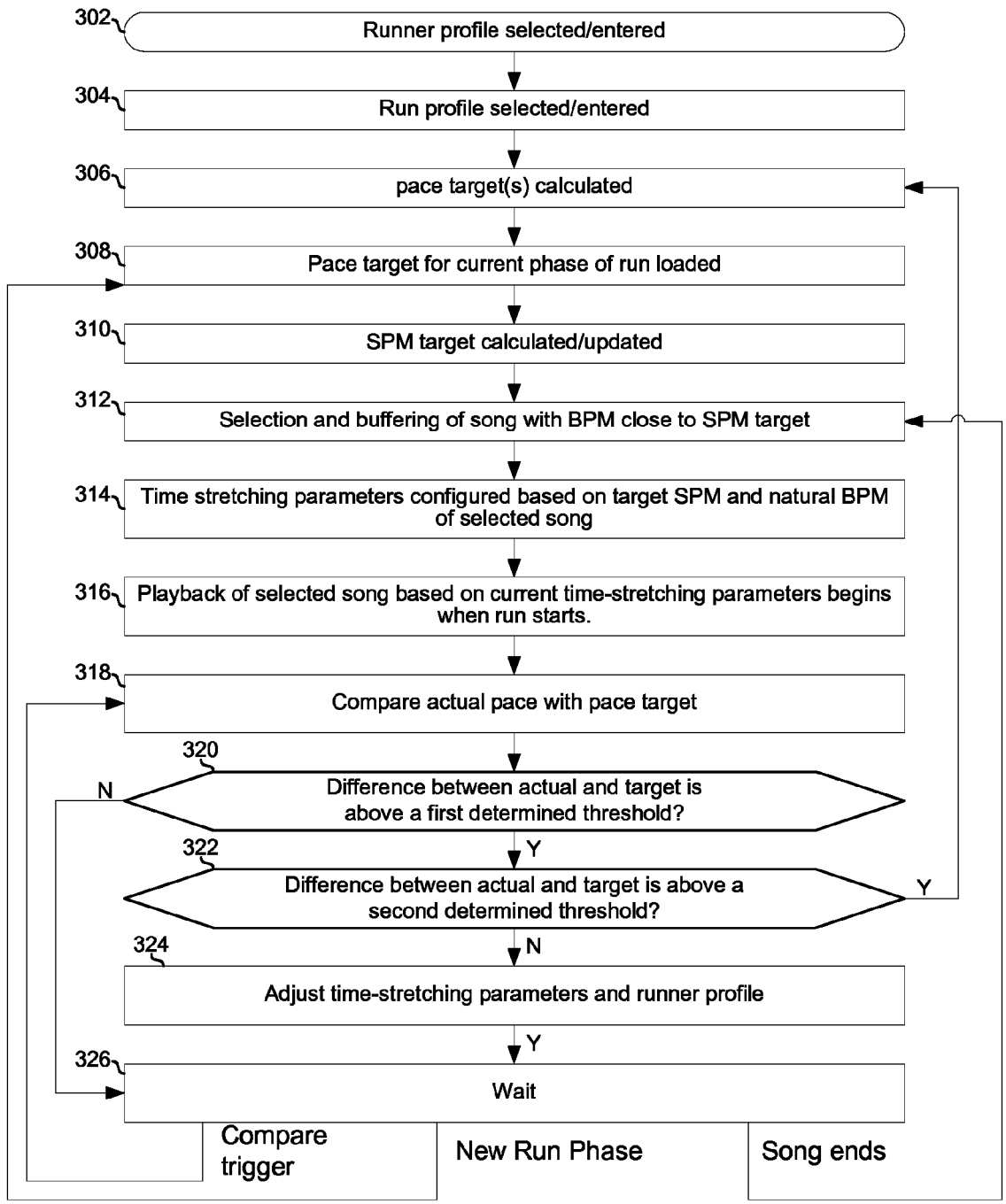
FIG. 3 is a flowchart illustrating operation of an example implementation of the pace tracking circuitry of FIG. 2.

FIG. 3 is a flowchart illustrating operation of an example implementation of the pace tracking circuitry of FIG. 2.

In block 302, a runner profile is selected/entered on the music player 100. The runner profile may comprise, for example, a lookup table that indicates the runner's stride length based on various parameters. For example, the runner's stride length may vary depending on the pace at which the runner is running and whether the runner is running on flat ground, uphill, or downhill. Accordingly, a lookup table may accept the current pace of the runner and the current incline of the ground, and output the current stride length of the runner. The lookup table may be manually populated by the runner and/or may be generated based on historical sensor and/or positioning data collected during previous runs by the particular runner. For example, during runs in which the runner's profile is selected, pedometer data from sensor(s) 110 and pace/position data from the positioning circuitry 114 may be collected and used to populate/update the runner's stride length lookup table in his/her profile. Ground incline/decline information may be retrieved based on, for example, GPS coordinates in combination with a elevation map program or API, altimeter, and/or the like.

In block 304, a run profile is selected/entered on the music player 100. The run profile may comprise, for example, time and distance targets for a run that the runner is about to embark on. As an example, a simple run profile may comprise a total time and a total distance (e.g., the runner wants to run 1 mile in 10 minutes). As an example of a more complex run profile, the run may be broken into multiple phases with each phase having its own target time and distance values instead of, or in addition to, an overall run time and distance target. For example, a run may comprise a warmup phase with a 5 minute time target and 0.25 mile distance target, a main phase with a 20 minute time target and 3 mile distance target, and a cool-down phase with a 5 minute time target and 0.25 mile distance target.

In block 306, a pace target is calculated/updated for each phase of the run. For example, for a one-phase run to cover 1 mile in 10 minutes, a first pass through block 306 may result in a pace target of 6 mph being calculated and subsequent passes through block 306 during the run may increase or decrease the pace target based on the runner's actual pace/progress such that the runner has covered very close to precisely 1 mile at the end of the 10 minute run. As another example, for the three-phase run example in the previous paragraph, a first pass through block 306 may result in warmup pace target of 3 mph (0.25 miles in 5 minutes), a main pace target of 9 mph (3 miles in 20 minutes), and a cool-down pace target of 3 mph (0.25 miles in 5 minutes) being calculated. Each subsequent passes through block 306 may result in one or more of those pace targets being updated such that the individual phase goals (0.25 miles in 5 minutes for warmup and cool-down phases and 3 miles in 20 minutes for main phase) and/or overall run goal (5 miles in 30 minutes) are achieved with desired accuracy.

In block 308, the pace target corresponding to the current phase of the run is loaded (e.g., from storage 112 into memory 108) for use by the pace tracking circuitry. For example, for the three-phase run example above, the pace target for the warmup phase is loaded at minute 0 of the run, the pace target for the main phase is loaded at minute 3 of the run, and the pace target for the cool-down phase is loaded at minute 23 of the run.

In block 310, a strides-per-interval target is calculated/updated. For simplicity of description, it is assumed that the strides-per-interval target is measured in strides-per-minute (SPM), although the disclosure is not so limited, and other intervals may be used. The initial SPM target may be calculated based on the pace target loaded in block 310, and on distance-per-stride data in the runner's profile. Updates of the SPM target may be based on the runner's actual pace during the run (either directly, or indirectly via updates to the runner's distance-per-stride data in his/her profile).

In block 312, the pace tracking circuitry selects a song from the music library that has a natural tempo (for simplicity of description, it is assumed to be measured in beats-per-minute (BPM)) close to the SPM target calculated in block 310. The selection may be performed based on the song metadata in the music library.

In block 314, time stretching parameters used by the audio CODEC 206 are configured based on the natural BPM of the selected song and the SPM target. For example, if the natural BPM is 100 BPM and the SPM target is 97 SPM, then time stretching parameters may be configured for stretching the song by −3 BPM, or if the natural BPM is 120 BPM and the target SPM is 125 then time stretching parameters may be configured for stretching the song by +5 BPM.

In block 318, during the run, the runner's actual pace (as determined by positioning circuitry 114) is compared to the pace target of the current phase of the run. This comparison may occur periodically and/or on an event-driven basis (e.g., upon passing distance milestones) during the run.

Differences in actual pace and target pace may result from a variety of factors such as, for example, actual strides being shorter or longer than in the runner's profile (e.g., as a result of terrain, runner's physical condition, weather, etc.), and/or actual BPM (and therefore SPM) being different than target SPM as a result of an inability to precisely match the BPM of a song to the target BPM (e.g., because of finite range and/or resolution of time-stretching)

Accordingly, in block 320, it is determined whether the difference between the runner's actual pace and the target pace is above a first determined threshold (e.g., whether the difference is some value or percentage (e.g., 2%) or more of the pace target). If so, then the process advances to block 322.

In block 322, it is determined whether the difference between actual pace and target pace is above a second determined threshold (e.g., whether the difference is some value or percentage (e.g., 5%) or more of the pace target). If so, then the difference is considered too great to handle through time stretching alone (because too much time stretching would hinder the audio quality/listening experience). Accordingly, the process returns to block 310 where a new SPM is calculated to get the runner back on track to finish the run (and/or current phase of the run) in the target distance and time.

Returning to block 322, if the difference between the actual pace and the target pace is not above the second determined threshold, then the process advances to block 324.

In block 324, the time stretching parameters are adjusted to get the runner back on track to finish the run (and/or current phase of the run) in the target distance and time. After block 324 the process advances to block 326.

In block 326, the music player 100 waits for one of: triggering of another comparison of the actual pace and target pace (e.g., expiration of a timer or the runner passing a certain distance milestone), in which case the process returns to block 318; transition to a new phase of the run (e.g., from warmup phase to main phase), in which case the process returns to block 318; and the end (or approaching the end) of the current song, in which case the process returns to block 312.

Returning to block 320, if the difference between the actual pace and the target pace is not above the first determined threshold, then the process advances to block 326.

Figure 4:
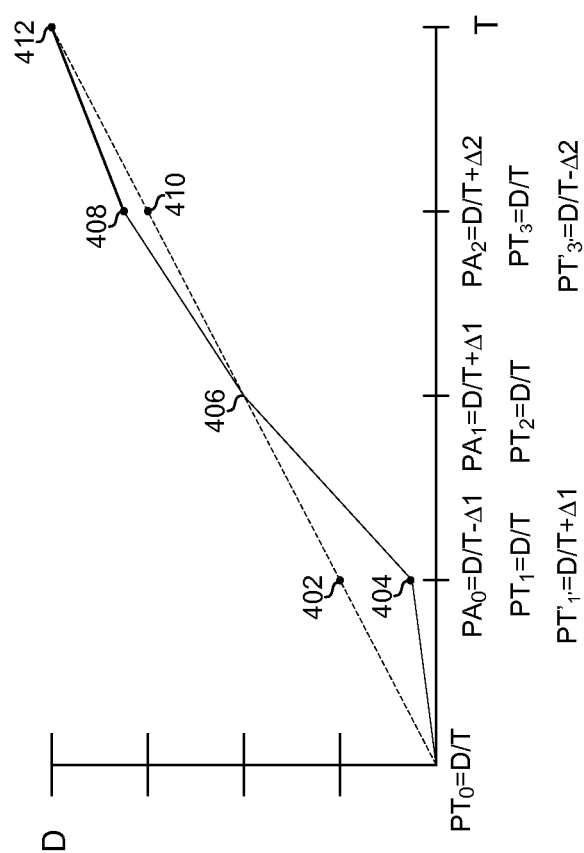
FIG. 4 is a graph depicting operation of an example implementation of the pace tracking circuitry of FIG. 2.

FIG. 4 is a graph depicting operation of an example implementation of the pace tracking circuitry of FIG. 2. In FIG. 4, the dashed line represents a run profile. For simplicity of illustration, a single-phase profile is selected in which the runner desires to run a distance D in an amount of time T, and in which the comparison of block 318 will be performed at time instants 1, 2, and 3 during the run (where 3 was chosen arbitrarily for illustration and is not limiting). Accordingly, a baseline pace target ("PT") of D/T is calculated for each of time instants 0, 1, 2, and 3. At time instant 0 the runner begins running.

At time instant 1, the actual pace during the interval between time instants 0 to 1 is compared against the target pace and is found to be Δ1 less. As a result, the actual distance covered, represented by point 404, is less than the target distance, represented by point 402. Accordingly, an adjusted pace target, $PT'_1=D/T+\Delta1$, is calculated and used for the interval between time instants 1 and time instants 2. Where Δ1 is above the first determined threshold and below the second determined threshold, the adjustment of the pace target may result in a change in the time stretching parameters to slow down the tempo of a song being played. Where Δ1 is above the second determined threshold, the adjustment of the pace target may result in a selection of a new song with a lower natural tempo.

At time instant 2, the actual pace during the interval between time instants 1 and 2 is compared against the target pace and is found to be equal. As a result, the runner made up for the time/distance lost during the interval between time instants 0 and 1 and is back on track (the target distance and actual distance are both at point 406). Accordingly, the pace target for the interval between time instants 2 and 3, $PT_2$, is kept at D/T.

At time instant 3, the actual pace during the interval between time instants 2 and 3 is compared against the target pace and is found to be Δ2 greater. As a result, the runner is now ahead of schedule with the actual distance covered, represented by point 408, being greater than the target distance covered, represented by point 410. Accordingly, the pace target for the interval between time instants 3 and 4, $PT_3$, is adjusted to D/T−Δ2. Where Δ2 is above the first determined threshold and below the second determined threshold, the adjustment of the pace target may result in a change in the time stretching parameters to speed up the tempo of a song being played. Where Δ2 is above the second determined threshold, the adjustment of the pace target may result in a selection of a new song with a faster natural tempo.

At time instant 4, the actual pace during the interval between time instants 3 and 4 is compared against the target pace and is found to be equal. As a result, the runner has completed the desired distance D in precisely the amount of time T.

Figure 5:
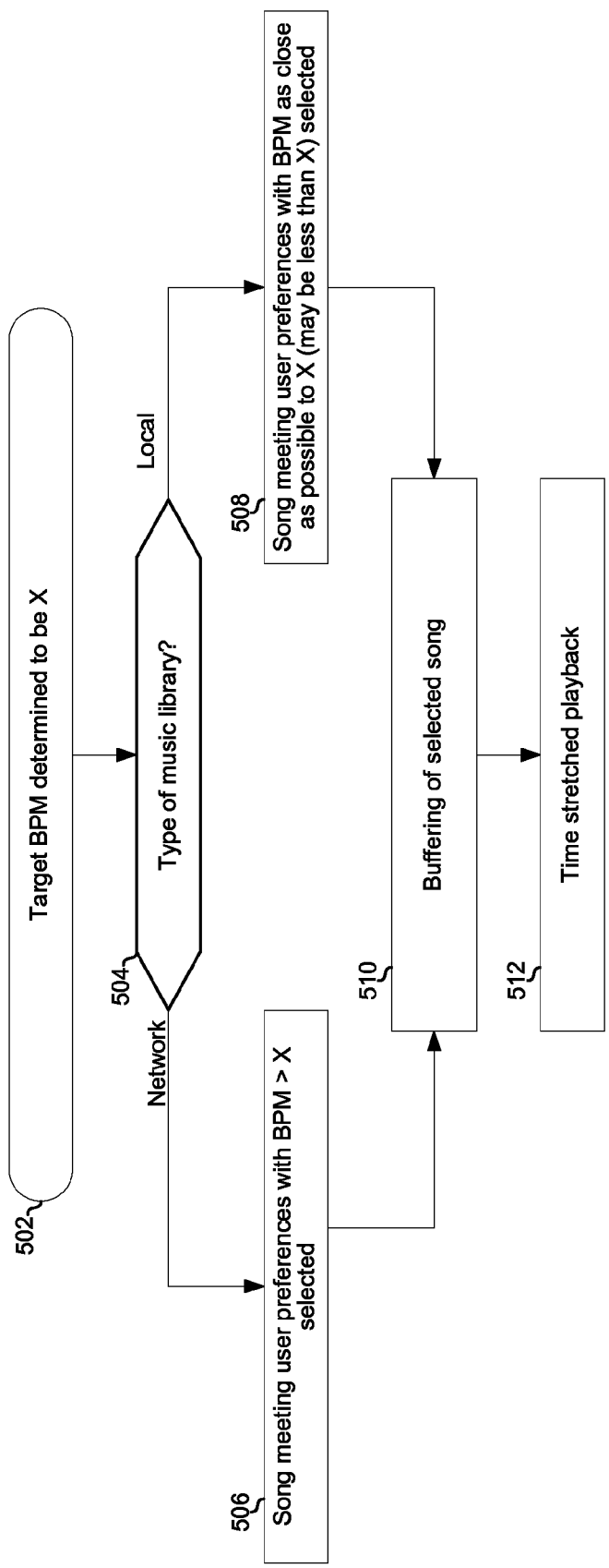
FIG. 5 depicts an example process for song selection and buffering in the music player 100.

FIG. 5 depicts an example process for song selection and buffering in the music player 100. In block 502, the target BPM of a song to be played is calculated to be X. In block 504, it is determined whether a song is to be retrieved from a local music library (e.g., in storage 112) or from a music service accessed over a network. If over a network, then the process advances to block 506. If local, then the process advances to block 508.

In block 506, a song meeting user preferences (e.g., genre, artist, and/or the like) having a natural BPM greater than X is selected. Restricting the possible song choices to those having a natural BPM greater than X by some determined threshold may ensure that, even for worst-case network conditions, a sufficient amount of the song may be buffered to prevent an underrun during playback. That is, time-stretching to slow the tempo results in data being read out of the buffer at a slower rate than if the song was played back at its natural tempo, thus reducing the amount of buffered data needed before playback as compared to playback at the natural tempo.

In block 508, a song meeting user preferences (e.g., genre, artist, and/or the like) having a natural BPM as close as possible to X is selected. Because throughput between a local music library is high and reliable, here, as compared to block 506, there is less concern that an underrun will occur. Accordingly, a song having a natural BPM less than X may be selected.

In block 510, the selected song is placed in a buffer until a sufficient amount of the song is buffered to avoid an underrun (with sufficient probability).

In block 512, playback of the song, time stretched as appropriate to meet the target BPM, occurs.

In accordance with an example implementation of this disclosure, an electronic device (e.g., 100) may comprise audio processing circuitry (e.g., 104), pace tracking circuitry (e.g., 106), and positioning circuitry (e.g., 114). The pace tracking circuitry may be operable to selects songs to be processed for playback, and/or control time stretching applied to such songs, by the audio processing circuitry based on position data generated by the positioning circuitry. The position data may indicate the pace of a runner during a preceding, determined time interval (e.g., at time instant 1 of FIG. 4 the position data for the time interval between time instants 0 and 1). The pace tracking circuitry may be operable to control the song selection and/or time stretching based on runner profile data stored in memory of the music device. The profile data may comprise runner's distance-per-stride data. The electronic device may comprise one or more sensors operable to function as a pedometer. The pace tracking circuitry may be operable to update the distance-per-stride data based on the position data and based on data output by the one or more sensors.

The present method and/or system may be realized in hardware, software, or a combination of hardware and software. The present methods and/or systems may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip. Some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

What is claimed is:

1. A system comprising:
an electronic device comprising audio processing circuitry, and pace tracking circuitry, wherein:
said pace tracking circuitry is operable to select, from a plurality of locally-stored songs and a plurality of network-accessible songs, one or more songs to be processed for playback by said audio processing circuitry;
said pace tracking circuitry is operable to control said selection based on a desired playback tempo of said one or more songs such that:
for said locally-stored songs, those of said locally-stored songs that have a natural tempo less than said desired tempo are eligible to be among said selected one or more songs; and
for said network-accessed songs, only those of said remotely-stored songs that have a natural tempo greater than said desired tempo are eligible to be among said selected one or more songs.

2. The system of claim 1, comprising positioning circuitry operable to generate position data that indicates pace of a runner during a preceding, determined time interval.

3. The system of claim 1, wherein:
said electronic device comprises memory, and:
said pace tracking circuitry is operable to control said song selection based on runner profile data stored in said memory.

4. The system of claim 3, wherein said profile data comprises distance-per-stride data.

5. The system of claim 4, wherein:
said electronic device comprises one or more sensors operable to function as a pedometer;
said electronic device comprises positioning circuitry operable to generate position data; and
said pace tracking circuitry is operable to update said distance-per-stride data based on said position data and based on data output by said one or more sensors.

6. The system of claim 1, wherein:
said pace tracking circuitry is operable to control time stretching applied to songs processed for playback by said audio processing circuitry; and said pace tracking circuitry is operable to control said time stretching based on position data generated by positioning circuitry of said electronic device.

7. The system of claim 6, wherein said position data indicates pace of a runner during a preceding, determined time interval.

8. The system of claim 6, wherein:
said electronic device comprises memory, and:
said pace tracking circuitry is operable to control said time stretching based on runner profile data stored in said memory.

9. The system of claim 8, wherein said profile data comprises distance-per-stride data.

10. The system of claim 9, wherein:
said electronic device comprises one or more sensors operable to function as a pedometer;
said electronic device comprises positioning circuitry operable to generate position data; and
said pace tracking circuitry is operable to update said distance-per-stride data based on said position data and based on data output by said one or more sensors.

11. A method comprising:
in an electronic device comprising audio processing circuitry, and pace tracking circuitry:
selecting, by said pace tracking circuitry, one or more songs to be processed for playback by said audio processing circuitry, wherein:
said selecting is based on desired playback tempo of said one or more songs;
said one or more songs are selected from among a plurality of locally-stored songs and a plurality of network-accessible songs;
for said locally-stored songs, those of said locally-stored songs that have a natural tempo less than said desired tempo are eligible to be among said selected one or more songs; and
for said network-accessed songs, only those of said remotely-stored songs that have a natural tempo greater than said desired tempo are eligible to be among said selected one or more songs.

12. The method of claim 11, wherein said electronic device comprises positioning circuitry operable to generate position data that indicates pace of a runner during a preceding, determined time interval.

13. The method of claim 11, wherein said electronic device comprises memory, and the method comprises:
said pace tracking circuitry controlling said song selection based on runner profile data stored in said memory.

14. The method of claim 13, wherein said profile data comprises distance-per-stride data.

15. The method of claim 14, wherein said electronic device comprises one or more sensors operable to function as a pedometer, and the method comprises:
said pace tracking circuitry updating said distance-per-stride data based on position data generated by positioning circuitry of said electronic device, and based on data output by said one or more sensors.

16. The method of claim 11, comprising:
said pace tracking circuitry controlling time stretching applied to songs processed for playback by said audio processing circuitry based on position data generated by positioning circuitry of said electronic device.

17. The method of claim 16, wherein said position data indicates pace of a runner during a preceding, determined time interval.

18. The method of claim 16, wherein said electronic device comprises memory, and the method comprises:
   said pace tracking circuitry controlling said time stretching based on runner profile data stored in said memory.

19. The method of claim 18, wherein said profile data comprises distance-per-stride data.

20. The method of claim 19, wherein said electronic device comprises one or more sensors operable to function as a pedometer and positioning circuitry operable to generate position data, and the method comprises:
   said pace tracking circuitry updating said distance-per-stride data based on said position data and based on data output by said one or more sensors.

* * * * *